April 28, 1959 F. G. MASON 2,883,864

CAM DRIVE FOR TUNERS

Filed March 27, 1957

INVENTOR.
Francis G. Mason
BY
Dome, McDougall, Williams & Hersh
Attorneys

United States Patent Office 2,883,864

Patented Apr. 28, 1959

2,883,864

CAM DRIVE FOR TUNERS

Francis G. Mason, Weston, Conn., assignor to Aladdin Industries Incorporated, Nashville, Tenn., a corporation of Illinois Application March 27, 1957, Serial No. 648,894

12 Claims. (Cl. 74—10.6)

This invention relates to radio frequency tuners or the like, and pertains particularly to cam drives for such tuners.

One object of the present invention is to provide a new and improved cam drive whereby a plurality of linearly movable tuning elements may be moved to a plurality of positions or channel settings, with provision for adjusting the position of each of the tuning elements in each of the channel settings.

A further object is to provide a new and improved cam drive of the foregoing character which utilizes adjustable cams in the form of flat plates having a plurality of individually bendable cam lobes.

Another object is to provide a new and improved cam drive having a cam follower arrangement with equalized spring tension so that the resistance to rotation of the operating shaft is substantially constant throughout the range of rotation of the shaft.

It is a further object to provide an equalized cam drive of the foregoing character having a plurality of cam followers which are biased by a single equalized spring, yet are arranged to follow their individual cams perfectly, despite individual variations in the cams.

Another object is to provide a new and improved cam drive which is precise in operation and flexible in adjustment, yet is relatively simple, sturdy and low in cost.

Further objects and advantages of the present invention will appear from the following description, taken with the accompanying drawings, in which.

Figure 2:
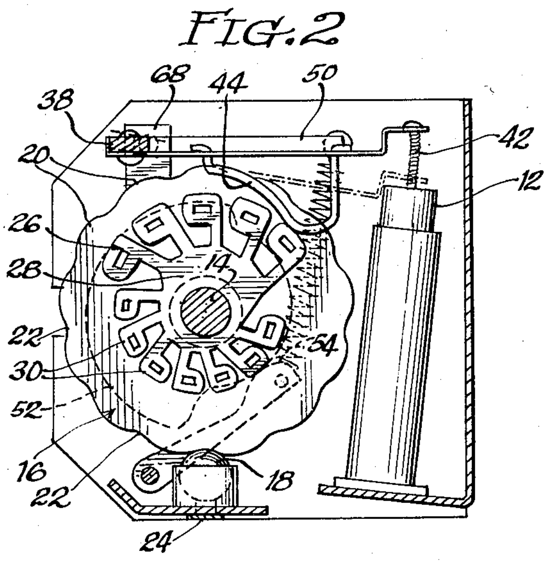
Fig. 2 is an elevational sectional view, taken generally along a line 2—2 in Fig. 1.
Figure 3:
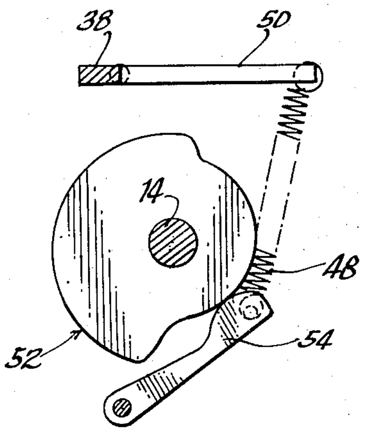
Fig. 3 is a fragmentary elevational sectional view, taken generally along a line 3—3 in Fig. 1.
Figure 1:
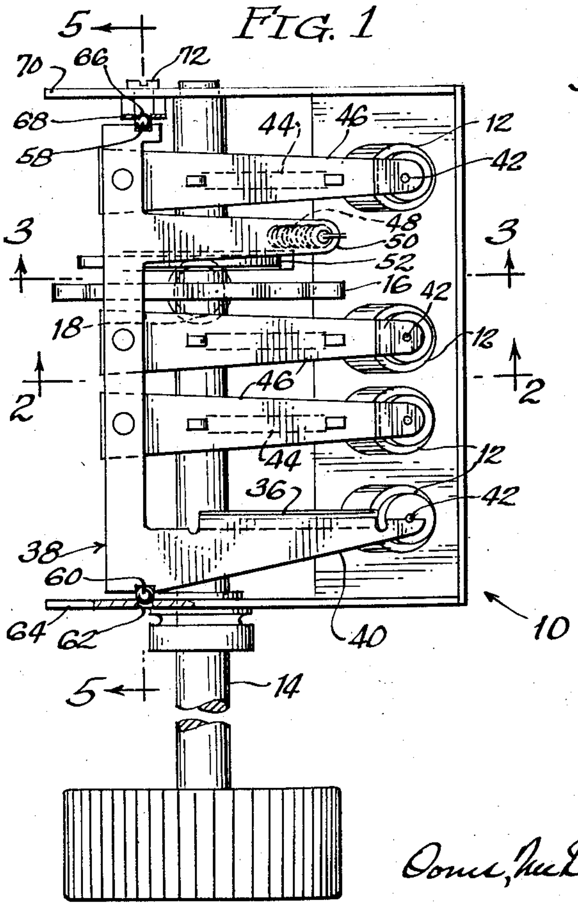
Fig. 1 is a plan view of a radio frequency tuner equipped with a cam drive to be described as an illustrative embodiment of the present invention.
Figure 4:
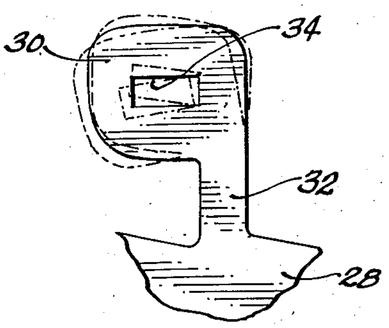
Fig. 4 is an enlarged elevational view showing one of the bendable lobes on one of the cams employed in the tuner of Fig. 1.
Figure 5:
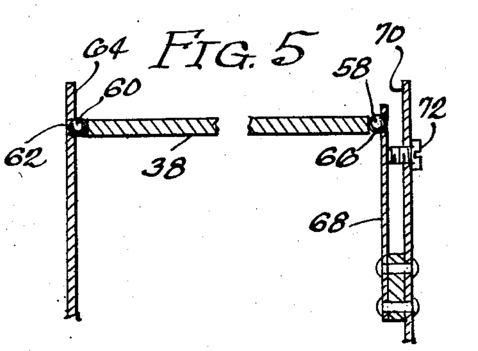
Fig. 5 is a sectional view taken generally along a line 5—5 in Fig. 1.

As already indicated, the drawings illustrate a tuner 10 which is of the type having linearly movable or slidable tuning elements 12, four such elements being employed in the illustrated tuner. While the tuning elements 12 may be employed in a variety of circuits, the illustrated tuning elements may be considered to be the four tuning elements of a superheterodyne television receiver. Thus, one of the elements 12 may be employed to tune the high frequency oscillator, one to tune the antenna circuit, and the other two for the purpose of tuning the coupling circuit between the radio frequency amplifier and the superheterodyne mixer. In a circuit of this character, it is necessary to operate the tuning elements simultaneously in such a manner that they will track, or tune in a single signal with precision.

Individually, the linearly movable tuning elements 12 may be of various types. They may be of the type having a linearly movable tuning sleeve, as disclosed and claimed, for example, in the application of Harold T. Lyman, Serial No. 438,043, now Patent No. 2,832,891. Alternatively, the tuning elements 12 may utilize linearly movable coils, as disclosed and claimed in the application of Harold T. Lyman and Francis G. Mason, Serial No. 435,159, now Patent No. 2,781,451 or linearly movable cores or slugs, as disclosed and claimed in the application of Francis G. Mason, Serial No. 503,921. Various types of linearly movable tuning elements are well known in the art and need not be described specifically herein.

In this case, all of the tuning elements 12 are operated by rotating a single tuning shaft 14. A detent wheel or cam 16 is mounted on the shaft 14 and is engageable with a detent ball 18 or the like to locate the shaft 14 in various positions of rotary adjustment. It will be seen that the detent cam 16 has a plurality of equally spaced lobes 20 with valleys 22 therebetween adapted to receive the detent ball 18. A spring 24 biases the ball 18 against the detent cam 16. The positions of the shaft 14, as located by the detent elements 16 and 18, may correspond to the 12 VHF television channels plus a 13th position for use of the tuner with a UHF converter.

It will be seen that four tuning cams 26 are mounted on the tuning shaft 14 to operate the four tuning elements 12. All of the tuning cams 26 may be essentially alike. They are arranged to provide for individual adjustment of the tuning elements 12 in each channel setting of the tuning shaft 14.

Thus, each of the illustrated tuning cams 26 is in the form of a flat plate having a central body portion 28 which is rigidly secured to the shaft 14. Twelve bendable cam lobes 30 are formed integrally with the body portion 28, one cam lobe being provided for each of the television channels. It will be realized that the number of cam lobes might be varied to suit various stations. It will be seen that the cam lobes 30 are regularly distributed around the periphery of the cam 26. Each cam lobe 30 has a narrow neck portion 32 which connects with the body portion 28 of the cam and is adapted to be readily bent to provide for easy adjustment of the cam lobe. In this case, the neck portion 32 extends between one side of the corresponding lobe 30 and the body portion 28 so that the radial height of the lobe may be varied by bending the lobe in the plane of the cam 26. Each cam lobe 30 has a tool-receiving slot 34 or other formation therein to facilitate the bending of the lobe. In this case, the slot 34 is generally rectangular and thus is adapted to receive a screw driver or a wrench having a rectangular tip.

In the illustrated tuner 10, one of the tuning cams 26 is adapted to be engaged by a cam follower 36 which is rigidly mounted on a rocker 38. More specifically, the illustrated rocker 38 has a substantially rigid arm 40 which supports the cam follower 36 and is adapted to be connected to one of the tuning elements 12. In this case, the flexible spring rod 42 is connected between the arm 40 and the tuning elements 12. The spring rod 42 may be soldered or otherwise secured to the outer end of the arm 40. Utilizing a soldered connection at this point has the advantage of providing for easy initial adjustment of the relationship between the arm 40 and the tuning elements 12.

The other tuning elements 12 are adapted to be operated by cam followers which engage the other cams 26. Each of the cam followers 44 is swingable with the rocker 38, but is resiliently connected thereto so that it will follow any individual variations in the lobes 30 of the corresponding cam. In this case, each follower 44 is mounted on a leaf spring or flexible arm 46 secured to the rocker 38. The flexible spring rods 42 of the other tuning elements 12 are soldered or otherwise secured to the outer ends of the flexible arms 46.

All of the cam followers 36 and 44 are biased against the other cams 26 by a single spring 48 which is connected to an arm 50 on the rocker 38. The spring 48 is sufficiently strong to flex all of the flexible arms 46 so that the followers 44 will always be in firm engagement with the other cams 26. Any individual variations in the cams 26 will flex the arms 46 with respect to the rocker 38. Thus, all of the followers 36 and 44 will follow their cams precisely at all positions of the tuning shaft 14.

An arrangement is provided for maintaining the length and the strength of the biasing spring 48 substantially constant for all positions of the tuning shaft 14. In this way, the spring resistance felt by the operator as he rotates the shaft 14 will remain substantially the same for all positions of the shaft. The spring equalizing arrangement comprises an equalizing cam 52 which is secured to the shaft 14 and is engageable with an equalizing cam follower 54. It will be seen that the spring 48 is connected between the equalizing cam follower 54 and the rocker arm 50. The shape of the equalizing cam 52 is inversely related to the shape of the tuning cams 26, so that the equalizing cam follower 54 will be moved in an opposite radial sense to the movement of the rocker 38. In this way, the length and strength of the spring 48 is maintained substantially constant. The spring 48 is always stretched to a considerable extent and thus is effective to hold the tuning followers 36 and 44 and the equalizing follower 54 against their respective cams 26 and 52 all the times. Due to the shape of the equalizing cam 52, equalizing follower 54 moves inwardly when the rocker arm 50 moves outwardly, and vice versa, so that the spring 48 is always stretched to substantially the same extent. Moreover, the torque exerted on the tuning cams by the tuning followers is effectively balanced by the torque exerted on the compensating cam by the compensating follower. Consequently, the torque resistance, felt by the operator in shifting from channel to channel, remains substantially constant throughout the tuning range.

To prevent lateral and longitudinal play, the rocker 38 is pivoted on spring loaded bearings. Thus, balls or other pivots 58 and 60 are soldered, staked or otherwise secured to the front and rear ends of the rocker 38. In this case, the rear ball 60 is pivoted in a hole 62 formed in the rear frame plate 64, the hole 62 being smaller than the ball 60, so that the ball 60 will project only part way into the hole. The front ball 58 is received in a similar manner in a hole 66 formed in a leaf spring 68, which biases the rocker rearwardly and prevents any play. It will be seen that the leaf spring 68 is mounted on a front frame plate 70. A stop screw 72 may be threaded through the plate 70 to limit frontward movement of the leaf spring 68, and thereby prevent accidental dismounting of the rocker 38 from its pivotal supports.

It will be realized that the illustrated cam drive provides for precise simultaneous operation of the tuning elements. The tuning element to be operated with the highest degree of precision may be arranged to be operated by the rigid cam follower 36. As the tuning shaft is rotated, the resiliently mounted cam followers 44 will swing with the rigid cam follower but will flex slightly with respect thereto so as to follow any individual variations in the corresponding cams. The positions of the tuning elements at all of the television channels may be adjusted individually by bending the lobes 30 on the corresponding cams 26. By virtue of the equalizing cam 52 and its follower 54, the length and strength of the single biasing spring 48 is maintained substantially constant so that constant spring resistance is felt when the shaft 14 is rotated.

Various modifications, alternative constructions and equivalents may be employed without departing from the true spirit and scope of the invention, as exemplified in the foregoing description and defined in the following claims.

I claim:

1. In a radio frequency tuner, the combination comprising a plurality of generally parallel slidable tuning elements, a plurality of tuning cams for operating said elements, an operating shaft supporting said cams, said shaft being rotatable to a plurality of positions, detent means for locating said shaft in said positions, each of said cams having a plurality of adjustable lobes corresponding to said positions, each of said lobes being bendable to adjust the radial height thereof, a swingable rocker member having a first cam follower rigidly mounted thereon and engageable with one of said cams, said rocker member having an arm thereon connected to one of said slidable tuning elements for operating the same, said rocker member having a flexible, resilient arm thereon connected to another of said slidable tuning elements for operating the same, said flexible arm having a second cam followed mounted thereon and engageable with another of said cams, an equalizing cam mounted on said shaft, an equalizing cam follower engageable with said equalizing cam, a spring connected between said rocker member and said equalizing cam follower for biasing said equalizing cam follower and said first cam follower against their respective cams, said equalizing cam having a shape corresponding generally but inversely related to the shape of said tuning cams so as to maintain the length of said spring and the force exerted thereby substantially constant, said flexible arm being swingable with said rocker member but being adapted to flex relative thereto so as to follow any minor variations between said tuning cams.

2. In a radio frequency tuner, the combination comprising a plurality of slidable tuning elements, a plurality of cam followers connected to said elements, a rotatable tuning shaft, a plurality of tuning cams secured to said shaft and engageable with said cam followers, means resiliently biasing said followers against said cams, detent means for locating said shaft in a plurality of positions, each of said cams comprising a plate having a body portion secured to said shaft, a plurality of distinct lobes engageable with said cam follower in the various positions of said shaft, and a plurality of narrow generally radial neck portions extending between said lobes and said body portion and being bendable to adjust the radial height of said lobes, each of said lobes having a tool-receiving slot therein for use in moving said lobe in the plane of said plate and thereby bending the corresponding neck portion.

3. In a radio frequency tuner, the combination comprising a linearly movable tuning element, a first cam follower connected to said element, a rotatable tuning shaft, a tuning cam secured to said shaft and engageable with said first cam follower, an equalizing cam mounted on said shaft, an equalizing cam follower engageable with said equalizing cam, and a spring connected between said first cam follower and said equalizing cam follower for biasing said followers against their respective cams, said equalizing cam having a shape inversely related to the shape of said tuning cam for maintaining the length and strength of said spring substantially constant for various rotary positions of said shaft.

4. In a radio frequency tuner, the combination comprising a plurality of linearly movable tuning elements, a rotatable tuning shaft, a plurality of tuning cams secured to said shaft, each of said cams having a plurality of individually adjustable lobes thereon, a rocker having a first cam follower rigidly mounted thereon and engageable with one of said tuning cams, means connected between said rocker and one of said tuning elements for operating the same, a second cam follower resiliently mounted on said rocker and engageable with another of said tuning cams, means connecting said second follower to another of said tuning elements for operating the same, a spring acting on said rocker and resiliently biasing said followers against their respective cams, said second follower being swingable and said rocker but being resiliently movable with respect thereto so as to follow individual variations in the lobes on the corresponding cam.

5. In a radio frequency tuner, the combination comprising first and second linearly movable tuning elements, a rotatable tuning shaft, detent means for locating said shaft in a plurality of positions, first and second tuning cams secured to said shaft, each of said cams comprising a flat plate having a body portion and a plurality of lobes bendable in the plane of said plate to adjust the radial heighth of said lobes, each of said lobes having a narrow neck portion connected to said body portion to provide for the bendable adjustment of the lobe, a rocker having a first cam follower rigidly mounted thereon and engageable with said first tuning cam, means connecting said first follower to said first tuning element for operating the same, a second cam follower resiliently mounted on said rocker and engageable with said second tuning cam, means connecting said second follower to said second tuning element for operating the same, said second follower being swingable with said rocker but being resiliently movable relative thereto so as to follow individual variations in the lobes on said second cam, an equalizing cam secured to said shaft, an equalizing cam follower engageable with said equalizing cam, a spring connected between said rocker and said equalizing cam follower for biasing said first and second followers and said equalizing follower against their respective cams, said equalizing cam having a shape inversely related to the shape of said tuning cams for maintaining the length and strength of said spring substantially constant in the various positions of said shaft.

6. In a radio frequency tuner, the combination comprising a plurality of movable tuning elements, a plurality of cam followers connected to said elements, a rotatable tuning shaft, a plurality of tuning cams secured to said shaft and engageable with said cam followers, means resiliently biasing said followers against said cams, each of said cams comprising a plate having a body portion secured to said shaft, a plurality of distinct lobes engageable with said cam follower in the various positions of said shaft, and a plurality of narrow neck portions extending between said lobes and said body portion and being bendable to adjust the radial extent of said lobes.

7. In a radio frequency tuner, the combination comprising a movable tuning element, a first cam follower connected to said element, a rotatable tuning shaft, a tuning cam secured to said shaft and engageable with said first cam follower, an equalizing cam mounted on said shaft, an equalizing cam follower engageable with said equalizing cam, and resilient means operable between said first cam follower and said equalizing cam follower for biasing said first follower against said tuning cam, said equalizing cam and follower being inversely related to said tuning cam and follower for maintaining the strength of said resilient means substantially constant for various rotary positions of said shaft.

8. In a radio frequency tuner, the combination comprising first and second movable tuning elements, a rotatable tuning shaft, first and second tuning cams secured to said shaft, at least one of said cams having a plurality of individually adjustable lobes thereon, a first cam follower engageable with said first tuning cam, means connected between said first cam follower and said first tuning element for operating the same, a second cam follower resiliently mounted on said first cam follower and engageable with said second tuning cam, means connecting said second follower to said second tuning element for operating the same, and a spring acting on said first follower and resiliently biasing said followers against their respective cams, said second follower being movable with said first follower but being resiliently shiftable with respect thereto so as to follow individual variations between said cams.

9. In a radio frequency tuner, the combination comprising first and second movable tuning elements, a rotatable tuning shaft, first and second tuning cams secured to said shaft, each of said cams comprising a flat plate having a body portion and a plurality of lobes bendable in the plane of said plate to adjust the radial extent of said lobes, each of said lobes having a narrow supporting portion connected to said body portion to provide for the bendable adjustment of the lobe, a first cam follower engageable with said first tuning cam, means connecting said first follower to said first tuning element for operating the same, a second cam follower resiliently mounted on said first follower and engageable with said second tuning cam, means connecting said second follower to said second tuning element for operating the same, said second follower being movable with said first follower but being resiliently shiftable relative thereto so as to follow individual variations in the lobes on said second cam, an equalizing cam secured to said shaft, an equalizing cam follower engageable with said equalizing cam, a spring connected between said first cam follower and said equalizing cam follower for biasing said first and second followers and said equalizing follower against their respective cams, said equalizing cam and follower being inversely related to said tuning cams and followers for maintaining the length and strength of said spring substantially constant in the various positions of said shaft.

10. In a radio frequency tuner, the combination comprising a movable tuning element, a cam follower connected to said element, a rotatable tuning shaft, a tuning cam secured to said shaft and engageable with said cam follower, means resiliently biasing said follower against said cam, said cam comprising a plate having a body portion secured to said shaft, a plurality of distinct lobes engageable with said cam follower in the various positions of said shaft, and a plurality of narrow neck portions extending between said respective lobes and said body portion and being bendable to adjust the radial extent of said lobes.

11. In a radio frequency tuner, the combination comprising a plurality of movable tuning elements, a plurality of cam followers connected to said elements, a rotatable tuning shaft, a plurality of tuning cams secured to said shaft and engageable with said cam followers, means resiliently biasing said followers against said cams, each of said cams comprising a plate having a body portion secured to said shaft, a plurality of distinct lobes engageable with said cam follower in the various positions of said shaft, and a plurality of narrow neck portions extending between said lobes and said body portion and being bendable to adjust the radial extent of said lobes, each of said lobes having a tool receiving slot therein for use in adjusting the radial position of said lobe.

12. In a radio frequency tuner, the combination comprising a movable tuning element, a cam follower connected to said element, a rotatable tuning shaft, a tuning cam secured to said shaft and engageable with said cam follower, means resiliently biasing said follower against said cam, said cam comprising a plate having a body portion secured to said shaft, a plurality of distinct lobes engageable with said cam follower in the various positions of said shaft, and a plurality of narrow neck portions extending between said respective lobes and said body portion and being bendable to adjust the radial extent of said lobes, each of said lobes having a tool receiving slot therein for use in adjusting the radial position of said lobes.

References Cited in the file of this patent

UNITED STATES PATENTS

| | | |
|---|---|---|
| 2,163,864 | Bissell | June 27, 1939 |
| 2,483,105 | Rennick | Sept. 27, 1949 |
| 2,536,409 | Altmann et al. | Jan. 2, 1951 |